S. SARGENT.
Lantern.
No. 2,557. Reissued April 9, 1867.
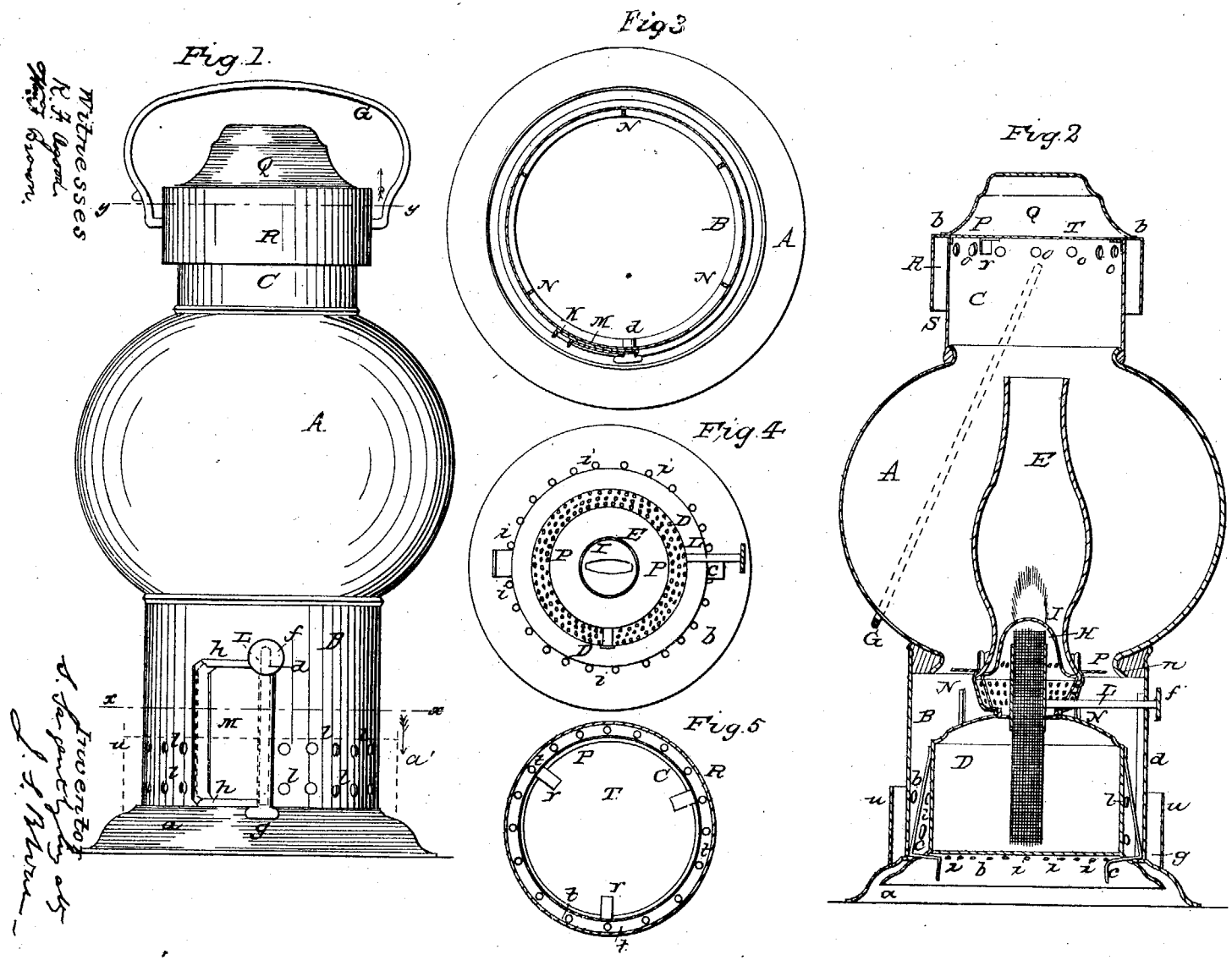
N. PETERS, Photo-Lithographer, Washington, D. C.

United States Patent Office.

ALFRED B. ELY, OF NEWTON, MASSACHUSETTS, ASSIGNEE BY MESNE ASSIGNMENTS OF SUMNER SARGENT.

*Letters Patent No.* 33,312, *dated September* 17, 1861; *reissue No.* 2,158, *dated January* 23, 1866; *reissue No.* 2,557, *dated April* 9, 1867.

IMPROVEMENT IN LANTERNS.

The Schedule referred to in these Letters Patent and making part of the same.

TO WHOM IT MAY CONCERN:

Be it known that SUMNER SARGENT, of Watertown, in the State of Massachusetts, has invented a new and improved Lantern for coal and other similar oils; and the following is a full and exact description thereof, with the accompanying drawings.

Figure 1 is a side elevation of lantern.

Figure 2, a central vertical section.

Figure 3, a transverse section of lantern body looking down in plane of line *x x*, fig. 1.

Figure 4, a plan of lamp detached.

Figure 5, a transverse section of lantern body looking up in plane of line *y y*, fig. 1.

I employ for the lantern body a glass globe, A, base B, top C, and cap Q, carried by a handle, G. The general construction of the lamp may be as desired, and the burner S of any desired kind, with or without a chimney. The lamp base *b* fits within the lantern base B, and is confined by two spring-catches *c c* springing over a flange, *e*, fig. 2. Any equivalent arrangement may be used. My first improvement is for the purpose of enabling the wick H to be regulated from the outside of the lantern without removing the lamp, and I make the wick-rod L long enough to reach out through the side of the lantern, so that its head *f* may be turned with ease. This passes through an aperture or opening in the side of the lantern base B, which is closed by a plate, M, fitting closely on the side of the base, and sliding between lips *h h* so as to open and close the aperture through which the wick-rod passes, (see black and red lines, fig. 1.) For the passage of the wick-rod up and down I use a vertical slot, *g d*, in the side of the lantern. This aperture may be of any desired size, the object being to make an opening in the side of the base through which the wick-rod may be thrust outside after the lamp is introduced inside, and then to close the opening to the passage of air, while the wick is reached to be regulated from the outside. Air is ordinarily admitted through small holes *l l* in the sides of the base, but when the lantern is suddenly lowered, to prevent its smoking I perforate the base flange *b* of the lamp with numerous small apertures *i i*, figs. 2 and 4, to introduce the air below the rim or edge of the base. My next improvement consists in an arrangement for collecting the draught, when the lantern is suddenly raised, by an annular band or cup, *u*, around the lower part of the base, open at the top so as to collect the air as the lantern ascends and force it through the draught-holes *l l*. My next improvement consists in a horizontal perforated plate, P, extending outward from the lamp-burner S, just above the draught perforations therein nearly to the body of the lantern. A narrow annular space, *n*, fig. 2, is left outside of the edge of the plate P, to allow a circulation of the air upward outside of the chimney E. The plate P is also perforated with very fine holes, (fig. 4,) so that while it arrests air enough for the burner, any excess quickly escapes upward into the globe. My next improvement consists in the use of an annular band, R, around the top C of the lantern, and outside the escape apertures *o o*, open at the bottom as at S, (fig. 2,) and terminating in perforations *t t*, (figs. 2 and 5,) at the top. This serves to prevent gusts of air impeding the escape of draught, and to reduce the temperature so as not to incommode the hand in carrying. I use a shield, T, in the top of the lantern body to prevent an overheating, which consists of a thin plate of metal just above the escape draughts *o o*, with a narrow annular space, *p*, (fig. 2,) around its edge for circulation.

What I claim as the invention, and desire to secure by Letters Patent, is—

1. Constructing the lantern, with an aperture or opening in the case through which the wick-regulator extends, so as to be reached and operated on the outside, when used in combination with such wick-regulator, substantially as described.

2. In combination with the above an opening and closing plate or its equivalent, for covering and uncovering the opening in the case, substantially as described.

3. The arrangement of the perforations *i i* in the base-flange of the lamp, the draught-collector *u*, and guard-cylinder R, or any two of them in combination, substantially as and for the purposes described.

A. B. ELY.

Witnesses:

CORNELS. JACOBS,

JOHN P. JACOBS.